(12) United States Patent
Kleeberger et al.

(10) Patent No.: US 6,248,052 B1
(45) Date of Patent: Jun. 19, 2001

(54) METHOD AND APPARATUS FOR THE FOLDING OF AN INFLATABLE AIRBAG

(75) Inventors: Peter Kleeberger, Remscheid; Christian Strasser; William Thomas Shaw, both of Dusseldorf, all of (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/353,182

(22) Filed: Jul. 14, 1999

(30) Foreign Application Priority Data

Jul. 14, 1998 (DE) .............................. 198 31 613

(51) Int. Cl.⁷ ................................... B31B 17/26
(52) U.S. Cl. ............... 493/374; 53/116; 53/244; 53/427; 53/449; 493/244; 493/405; 493/940; 280/728.1; 280/743.1
(58) Field of Search ............... 53/116, 117, 120, 53/244, 427, 429, 449, 457; 493/244, 405, 451, 457, 940; 280/728.1, 743.1

(56) References Cited

U.S. PATENT DOCUMENTS

| | | | |
|---|---|---|---|
| 5,803,483 | * 9/1998 | Lunt | 280/728.1 |
| 5,960,611 | * 10/1999 | Aigner et al. | 53/429 |
| 5,984,852 | * 11/1999 | Heudorfer et al. | 493/457 |
| 6,115,998 | * 9/2000 | Reh et al. | 53/429 |

FOREIGN PATENT DOCUMENTS

| | | | | |
|---|---|---|---|---|
| 195 36 625 A1 | * | 9/1995 | (DE) | B60R/21/20 |
| 195 46 232 A1 | * | 12/1995 | (DE) | B60R/21/20 |
| 19516264C1 | | 5/1996 | (DE) | B60R/21/16 |
| 196 48 654 A1 | * | 11/1996 | (DE) | B60R/21/22 |
| 19535564 | | 3/1997 | (DE) | B60R/21/20 |
| 19535564A1 | | 3/1997 | (DE) | B60R/21/20 |
| 19535565A1 | | 3/1997 | (DE) | B60R/21/20 |
| 19536625A1 | | 3/1997 | (DE) | B60R/21/20 |
| 19546232A1 | | 8/1997 | (DE) | B60R/21/20 |
| 0825072 | | 2/1998 | (DE) | B60R/21/16 |
| 19648654A1 | | 5/1998 | (DE) | B60R/21/22 |
| 9712782 | | 4/1997 | (WO) . | |

* cited by examiner

*Primary Examiner*—Peter Vo
*Assistant Examiner*—Hemant M Desai
(74) *Attorney, Agent, or Firm*—Kathryn A. Marra

(57) ABSTRACT

The invention relates to a method for the folding of an inflatable airbag for motor vehicles which comprises the steps that an airbag to be folded is fastened with its open end at a carrier; that a preferably substantially cylindrical piston is pushed forward into the airbag through an opening in the carrier and against the closed end of the airbag; and that the carrier and the piston are introduced into a sleeve, with the airbag being pressed together irregularly. The invention also relates to a folding apparatus for carrying out this folding method.

16 Claims, 7 Drawing Sheets

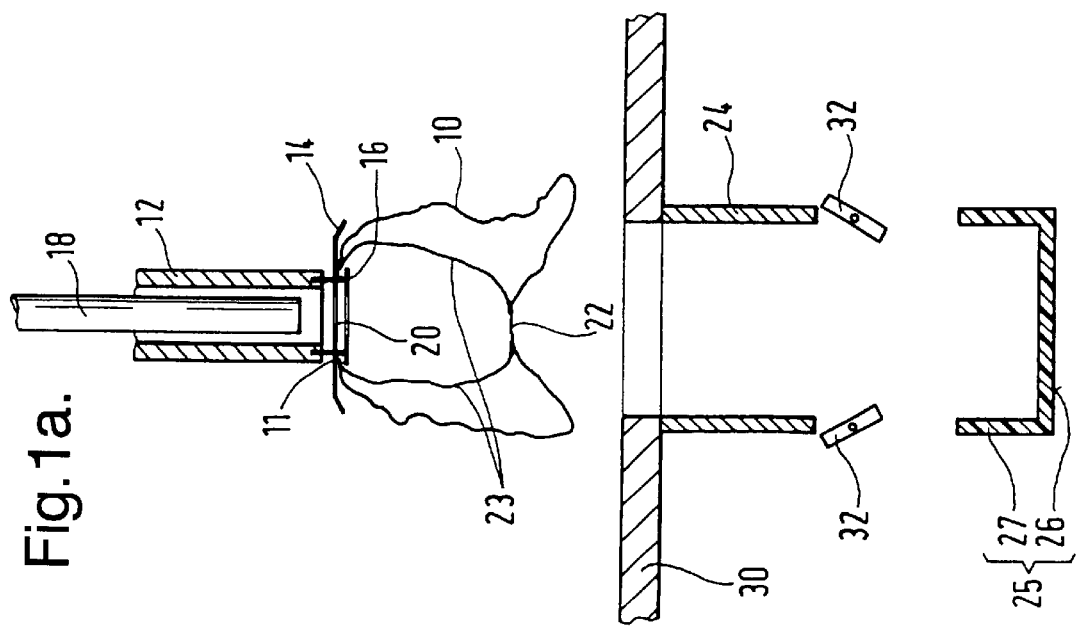
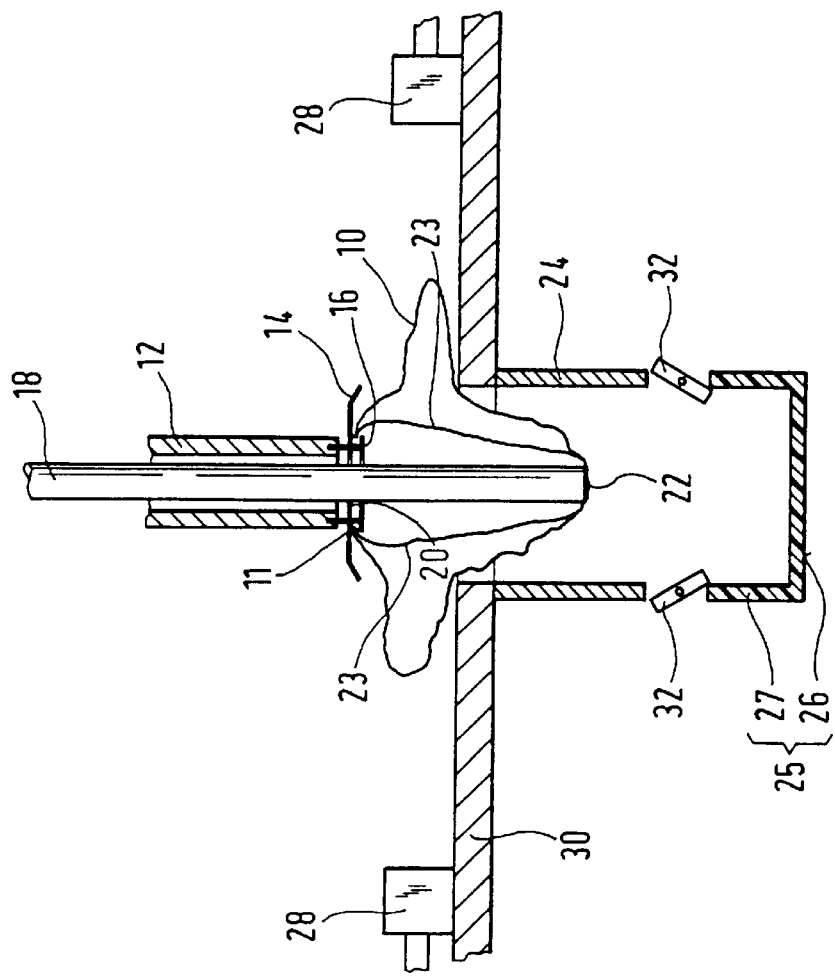
Fig.1a.
Fig.1b.

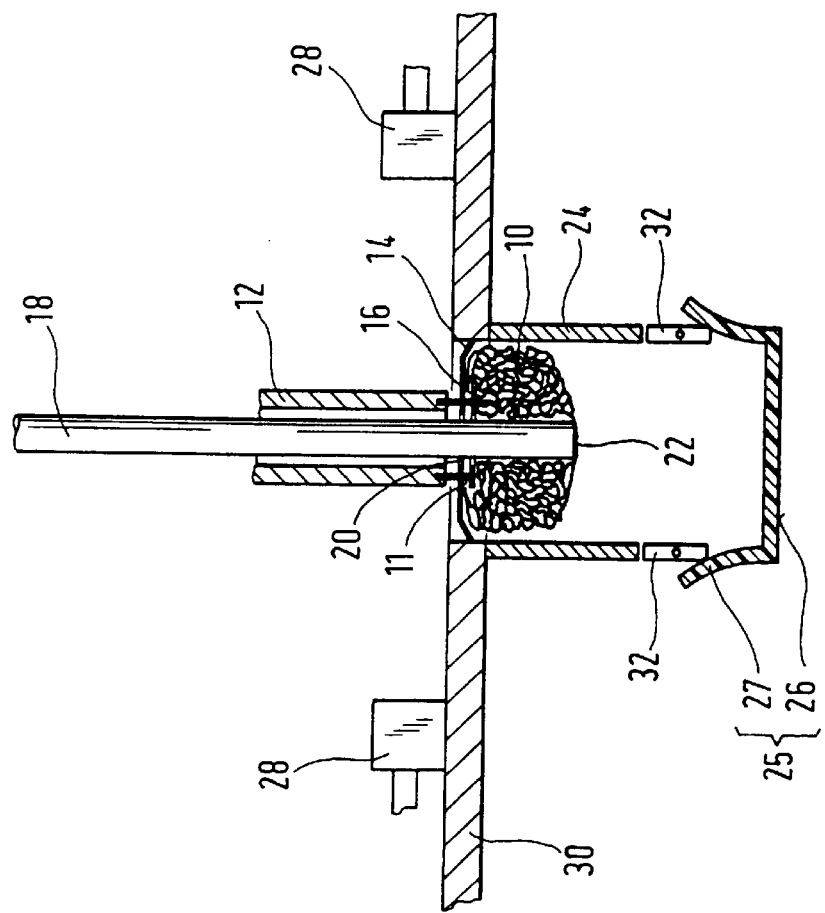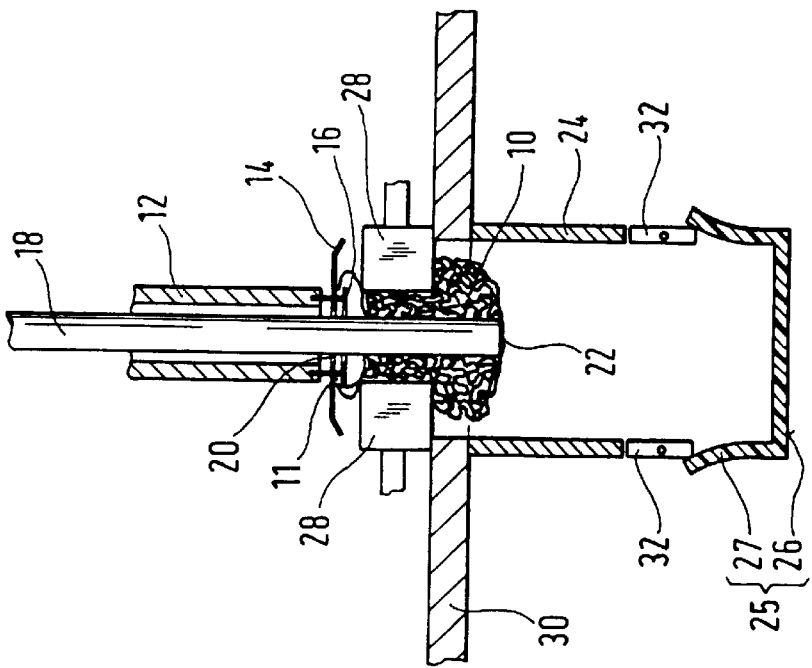

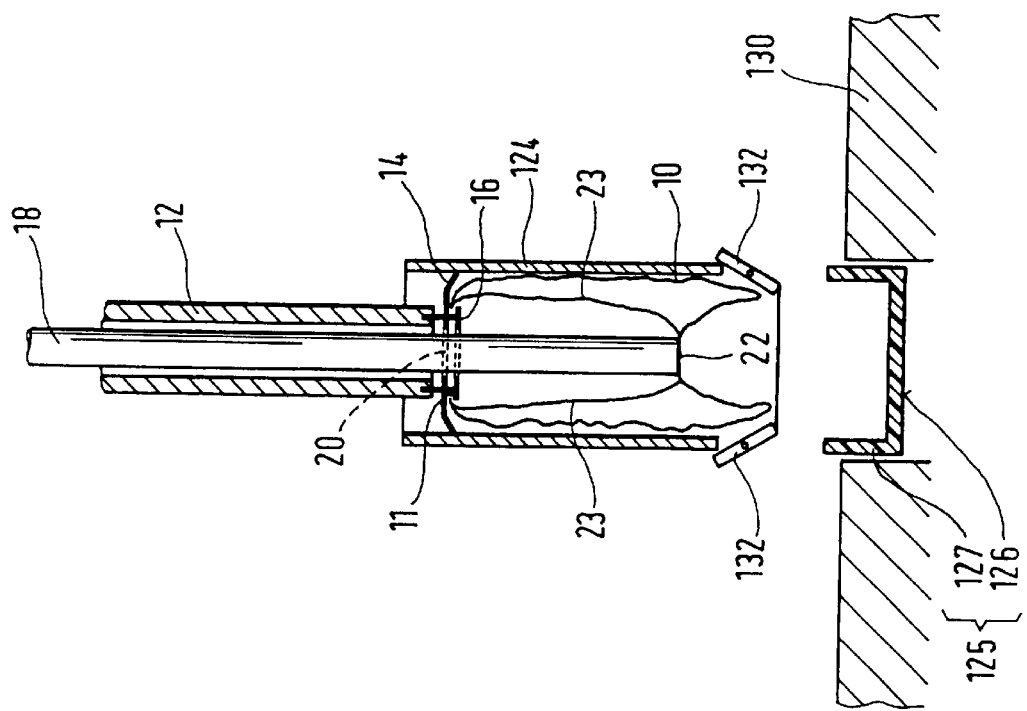
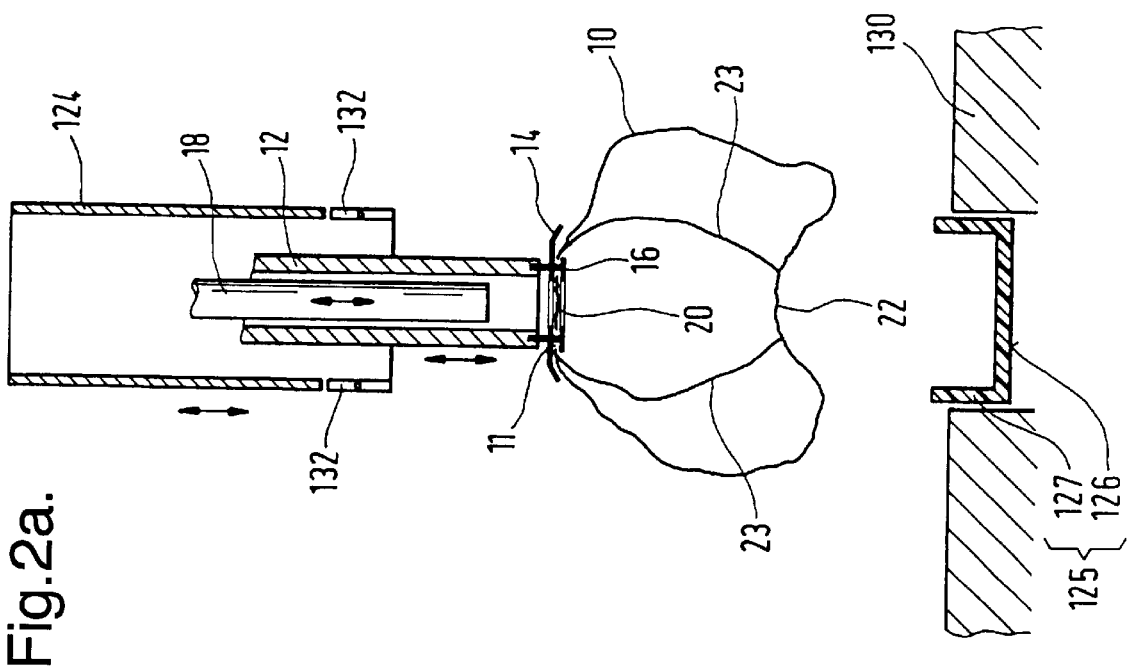

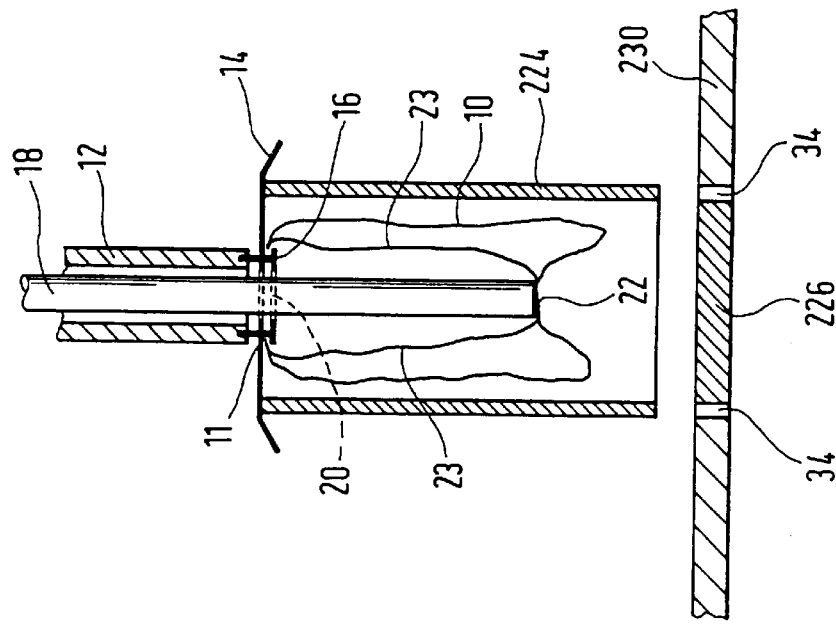
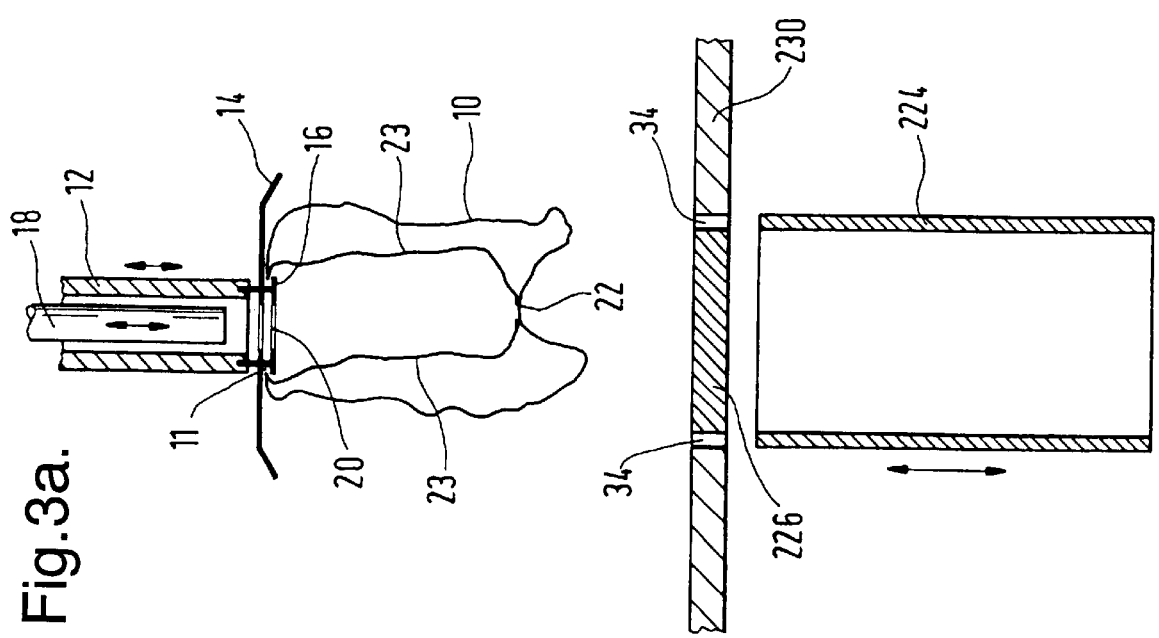

METHOD AND APPARATUS FOR THE FOLDING OF AN INFLATABLE AIRBAG

TECHNICAL FIELD

The invention relates to a method and to an apparatus for the folding of an inflatable airbag for motor vehicles.

BACKGROUND OF THE INVENTION

Methods and apparatuses of this kind serve to fold together an inflatable airbag to a size which permits the folded airbag to be mounted in a vehicle as a part of an airbag module for example as a driver's, a passenger's or a side airbag. In this the airbag must be folded in such a manner that it can unfold as quickly as possible and without damage to the airbag jacket in the event of a collision.

It is known from DE 195 36 625 A1 to fold an airbag in ring shape, with the open and the closed end of the airbag already being brought together at the beginning of the folding process.

It is known from DE 195 35 564 A1 to gather together an airbag which is spread out on a horizontal surface within a fixed height profile in the direction towards a centre.

SUMMARY OF THE INVENTION

The problem (object) lying at the basis of the invention is to provide a method and an apparatus for the folding of an inflatable airbag by means of which an airbag can be folded as simply and rapidly as possible in such a manner that it can unfold ideally in the event of a collision.

The solution of this problem takes place through the features of claim 1, which relates to the folding method, and in particular in that an airbag to be folded is fastened with its open end at a carrier; in that a preferably substantially cylindrical piston is pushed forward into the airbag through an opening in the carrier and against the closed end of the airbag; and in that the carrier and the piston are introduced into a sleeve, with the airbag being pressed together irregularly.

Through the pushing in of the piston into the airbag, when the carrier and the piston have been introduced into the sleeve, there is a ring space between the inner wall of the sleeve and the piston which serves as a folding space and in which the airbag jacket is pressed together to the desired height in a direction parallel to the piston. The ring-shaped folding of the airbag which thereby arises permits a radial unfolding of the airbag jacket.

In accordance with the invention the folding of the airbag need not take place within a space with a predetermined height. In addition the airbag or the airbag jacket respectively is not necessarily laid together in a defined and predictable manner, but is pressed or crumpled together so that an admittedly ring-shaped but otherwise arbitrary or "chaotic" folding arises; which nevertheless permits a rapid and ideal unfolding of the airbag in the radial direction. Furthermore, through the provision of the piston during the pressing together of the airbag, the gas generator need not be involved.

In accordance with a preferred embodiment of the invention the piston is pressed forward against the closed end of the airbag until one or more preferably band-like connection elements which are arranged in the interior of the airbag and which connect the closed end of the airbag to the open end of the airbag or to the carrier are tensioned.

Through this the closed end of the airbag is held firmly on a folding axis defined by the piston during the folding process so that it defines a centre about which the airbag jacket is laid in folds in ring shape. The danger that the closed end of the airbag arrives into a position which is laterally displaced with respect to the folding axis and thus into the region of the airbag jacket, which is folded in the shape of a ring, which would lead to an indefinite, no longer radial unfolding of the airbag, is avoided in this way.

In accordance with a further preferred exemplary embodiment of the invention, prior to the folding together of the airbag to its final packing size the piston is moved into a final position in the vicinity of a base element and preferably so close to the base element that a region of the closed end of the airbag is pressed against the base element.

Through this it is ensured that only a single layer of the airbag jacket is located between the base element and the gas generator, which is placed into the space which is held free by the piston after the completion of the folding process.

In accordance with a further preferred embodiment of the invention the airbag is pressed into a covering of an airbag module, with the covering comprising a base element and a wall section which is connected to the base element.

The manufacture of an airbag module which is ready for mounting is considerably accelerated in this way, since after the completion of the folding process the pressed together airbag is already located in its housing, which is formed by the covering and in which it is mounted in the vehicle.

In accordance with a further preferred exemplary embodiment of the invention the airbag is pressed together about the piston prior to the introduction of the carrier into the sleeve and is preferably pushed approximately in the horizontal direction in the direction towards the piston by pusher elements which are distributedly arranged about the piston.

It is thereby ensured that the airbag is not clamped in between the carrier and a boundary region which borders on an introduction opening of the sleeve when the carrier is introduced into the sleeve.

In accordance with a further preferred embodiment of the invention the preferably pressed together airbag is allowed to fall downwardly into the sleeve prior to the introduction of the carrier into the sleeve.

Prior to the pressing together of the airbag to the final packing size the airbag consequently hangs down from the carrier in ring shape about the piston so that it can first unfold already as a result of its own weight alone and can then be pressed together to the desired height in particular without undercutting.

The solution of the problem (object) lying at the basis of the invention also takes place through the features of claim 12, which relates to the folding apparatus, and in particular in that a carrier at which an airbag to be folded can be fastened with its open end, a preferably substantially cylindrical piston which can be pushed forward into the airbag through an opening which is formed in the carrier and against the closed end of the airbag, and a sleeve are provided into which the carrier and the piston can be introduced, with the carrier, the piston and/or the sleeve being movable relative to one another for the pressing together of the airbag.

Through the invention a simply constructed and variably applicable folding apparatus is created which provides a space with variable height and by means of which the airbag or the airbag jacket respectively can be pressed together to an arbitrary height without it being necessary to involve the gas generator in this.

In accordance with a preferred embodiment of the invention a carrier element of the carrier is releasably connected to a subassembly of an airbag module which preferably comprises a base plate and/or a preferably ring-shaped holder element, with the base plate preferably corresponding to the free inner cross-sectional surface of the sleeve in regard to shape and size.

The carrier for the fastening of the airbag to be folded is formed in this by the base plate, the holder element and the carrier element so that when the connection between the carrier element and the base plate or the holder element respectively is released after the completion of the folding process, a substantial subassembly of the airbag module is finished.

Further advantageous embodiments of the invention relating both to the folding method and to the folding apparatus are set forth in the subordinate claims, in the description and in the drawings.

BRIEF DESCRIPTION OF THE DRAWINGS

The present invention will now be described, by way of example, with reference to the accompanying drawings, in which:

FIGS. 1a–1f are side views of an embodiment of a folding apparatus in accordance with the invention in different phases of a folding method in accordance with the invention, FIGS. 2a–2d are a side view of a further embodiment of a folding apparatus in accordance with the invention in different phases of a further folding method in accordance with the invention, and FIGS. 3a–3d are a side view of a further embodiment of a folding apparatus in accordance with the invention in different phases of a further folding method in accordance with the invention.

DESCRIPTION OF THE PREFERRED EMBODIMENT

An embodiment of a folding apparatus in accordance with the invention is illustrated in FIGS. 1a to 1f and is provided for carrying out a folding method in accordance with the invention.

Figure 1F:
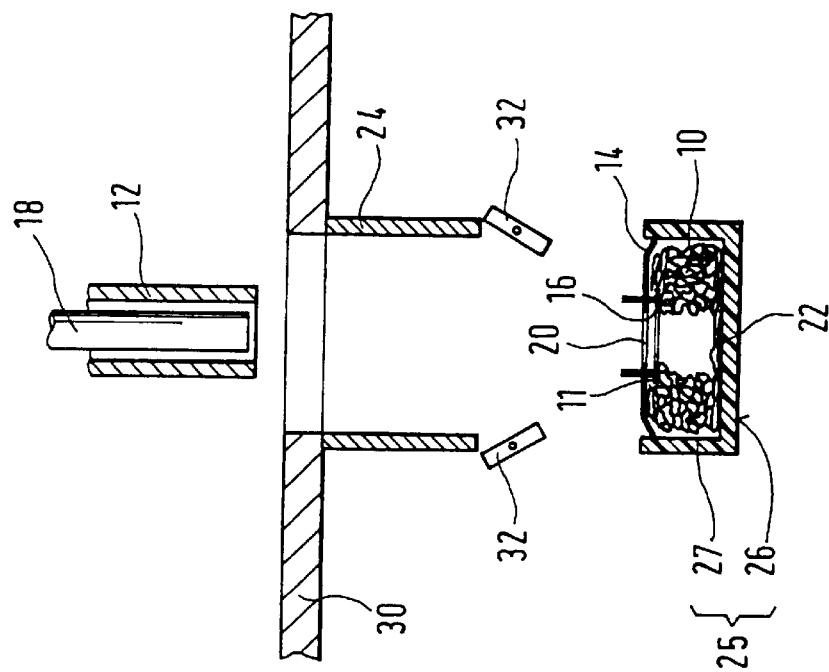
Figure 1E:
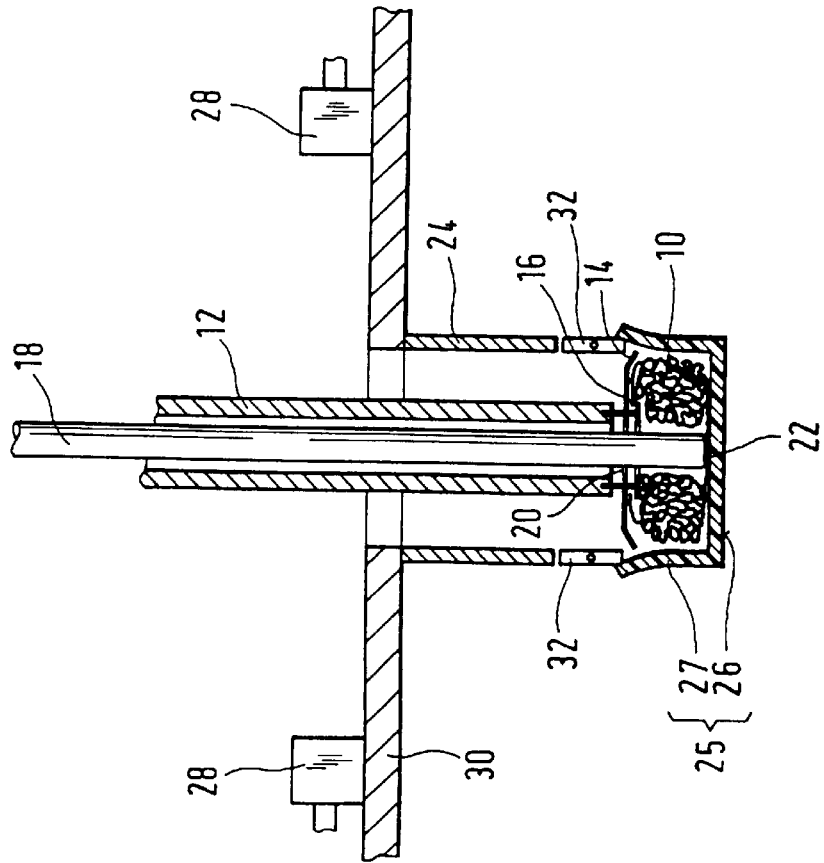

The folding apparatus illustrated in FIGS. 1a to 1f comprises in accordance with FIG. 1a a horizontally extending working plate 30 in which a cut-out is provided. Beneath the working plate 30 there is arranged a sleeve 24, the inner wall of which closes off flush with the boundary region which bounds the cut-out of the working plate 30 and of which the cross-sectional surface corresponds to that of the airbag 10 which has its final packing size.

Beneath the sleeve 24 there is arranged a covering 25 of an airbag module which comprises a base element 26 and a wall section 27 which is connected in a single piece to the base element 26 and which extends parallel to the sleeve wall. The free inner cross-sectional surface of the covering 25 corresponds to that of the sleeve 24.

Bending elements 32 which are shaped as rectangular parallelepipeds and are rotatably journalled are provided between the sleeve 24 and the covering 25. The purpose of the bending elements 32 will be described in the following in the explanation of the folding method in accordance with the invention.

Above the working plate 30 a carrier element 12 is arranged which carries at its lower side a base plate 14 and a ring-shaped holder element 16 of an airbag module, which will be designated in the following as a holder ring. Together with the base plate 14 and the holder ring 16 the carrier element 12 forms a carrier at which an airbag 10 to be folded is fastened with its open end 11, which is also designated as the mouthpiece of the airbag 10.

The airbag 10 is arranged with its region of the airbag jacket which bounds the mouthpiece around a circular opening 20 which is formed in the base plate 14 and in the holder ring 16.

The cross-sectional surface of the base plate 14 is dimensioned in such a manner that the base plate 14 can be introduced into the sleeve 24 and the covering 25 with a perfect fit.

A cylindrical piston 18 is movable in the vertical direction relative to the carrier and is displaceable through the carrier element 12, which is formed in tube shape, and through the opening 20, which is provided in the base plate 14 and the holder ring 16, into the airbag 10.

The diameter of the piston 18 and the diameter of the opening 20 correspond at least substantially to the diameter of a non-illustrated gas generator which is provided in the ready to mount airbag module.

The closed end 22 of the airbag 10 to be folded is connected via a plurality of, preferably two or four band-like connection elements 23, either to the region of the airbag jacket which forms the mouthpiece of the airbag 10 or to the base plate 14 or to the holder ring 16 respectively in such a manner that the closed end 22 or a region of the closed end 22 of the airbag 10 respectively is arranged beneath the opening 20, i.e. on a folding axis which is defined by the longitudinal axis of the piston 18.

The length of the connection elements 23 is chosen in such a manner that the airbag jacket 10 can hang downwardly about its closed end 22 down to below the height level which is defined by the closed end 22.

A folding method in accordance with the invention which can be carried out with the above explained folding apparatus will be described in the following with reference to FIGS. 1a–1f.

The airbag 10 to be folded is first fastened in the above described manner at the base plate 14 or at the holder ring 16 respectively with its open end 11 so that the airbag jacket in accordance with FIG. 1a hangs downwardly from the base plate 14 or from the holder ring 16 respectively.

Then the piston 18 is pushed into the airbag 10 and against the closed end 22 until the connection elements 23 are tensioned as is illustrated in FIG. 1b. Before, after or along with the forward thrust movement of the piston 18 into the airbag 10, the carrier element 12 is lowered.

The airbag jacket 10 is pressed together about the piston 18 by pusher elements 28 prior to the introduction of the base plate 14 into the sleeve 24. In this way regions of the downwardly hanging airbag jacket 10 which project outwardly beyond the periphery of the base plate 14 in accordance with FIG. 1b, are pushed under the base plate 14.

The pusher elements 28 are distributedly arranged about the folding axis which is defined by the longitudinal axis of the piston and is movable in the plane defined by the working plate 30. FIG. 1c shows that the pusher elements 28 press the airbag jacket 10 in the direction of the piston 18 in such a manner that the entire airbag jacket 10 is brought under the base plate 14.

Where appropriate the airbag jacket can be spread out on the working plate 30 prior to the pressing together by the pusher elements 28.

After the pressing together of the airbag jacket 10 the pusher elements 28 are moved back and the carrier element 12 is lowered further, as is illustrated in FIG. 1d.

In accordance with FIG. 1c the bending elements 32, which are mounted at the sleeve 24, are already brought during the pressing together of the airbag jacket 10 into an introduction position in which they form an extension of the inner wall of the sleeve with an inner longitudinal side and bend an elastically deformably designed region of the wall section 27 of the covering 25 outwardly with an outward side. In this way the introduction opening of the covering 25 is widened.

In a continuing downward movement of the carrier element 12 and of the piston 18 the front end of the piston 18 arrives into an abutment with the base element 26 of the covering 25, with the closed end 22 of the airbag 10 lying in between.

During the time between the pushing forward of the piston 18 into the airbag 10 up to the abutment of the piston 18 at the base element 26, preferably no or only a slight relative movement takes place between the piston 18 and the carrier element 12, i.e. the distance between the open end 11 and the closed end 22 of the airbag 10 remains at least substantially constant during this time.

After the piston 18 has abutted at the base element 26 of the covering 25 the carrier element 12 is lowered further and moved in the direction towards the base element 26. In this the airbag jacket 10, which is arranged in ring shape about the piston 18, is pressed together, i.e. pressed into the covering 25 until, in accordance with FIG. 1e, the base plate 14 and the holder ring 16 are located within the covering 25 and the desired packing height has been achieved.

Then in accordance with FIG. 1f the connection between the carrier element 12 and the base plate 14 or the holder ring 16 respectively is released and the carrier element 12 and the piston 18 are moved back upwardly. In addition the covering 25 is lowered so that the elastically deformable wall section 27 springs back, comes into engagement with the peripheral region of the base plate 14 and in this manner holds the base plate 14, the holder ring 16 and the pressed together airbag 10 fast.

The airbag 10, which is pressed together to its final packing size in accordance with FIG. 1f, is located ready for mounting within its covering 25, which forms the housing of the airbag module, with the airbag 10 being pressed together in ring shape about a central free space which remains after the withdrawing of the piston 18 and into which a non-illustrated gas generator of the airbag module can be inserted. The piston 18 is dimensioned in such a manner that the free space in the airbag module has the dimensions required for the gas generator.

Through the invention a rapid and simple to perform method for the folding of an airbag is created in which on the one hand it is provided for that the airbag jacket is pressed together in ring shape in order to enable a radial unfolding in the event of a collision, in which on the other hand however no defined and predictable forming of folds takes place within the folding space, but rather the precise course of the airbag jacket 10 is left to chance in accordance with a "chaotic" folding method, as is indicated by the tortuous lines in FIGS. 1c–1f.

The piston 18 of the folding apparatus in accordance with the invention fulfils a plurality of functions in that it serves as a dummy for a gas generator which is later to be inserted into the airbag module, in that it ensures that the airbag jacket 10 is pressed together in the shape of a ring about the gas generator in the ready to mount airbag module, and in that it ensures that only a single layer of the airbag jacket 10 is located between the gas generator and the base element 26 of the covering 25 in the ready to mount airbag module.

As far as nothing to the contrary is mentioned, the embodiments of a folding apparatus in accordance with the invention or a folding method in accordance with the invention respectively which are described in the following correspond to the embodiment described above with reference to FIGS. 1a to 1f in regard to the construction, the method of functioning and the advantageous effects.

In deviation from the above described embodiment, in accordance with FIG. 2a the covering 125 is stationarily arranged in a cut-out which is formed in the working plate 130. The sleeve 124, the carrier element 12 and the piston 18 are movable relative to the covering 125 and relative to one another in the vertical direction, as is indicated by the double arrow.

After the fastening of the airbag 10 to the base plate 14 or the holder ring 16 respectively and the pushing in of the piston 18 into the airbag 10, the sleeve 124 is pushed—without a pressing together of the airbag jacket about the piston 18—over the carrier element 12, the piston 18 and the airbag 10 in such a manner that the arrangement which is shown in FIG. 2b results.

Figure 2D:
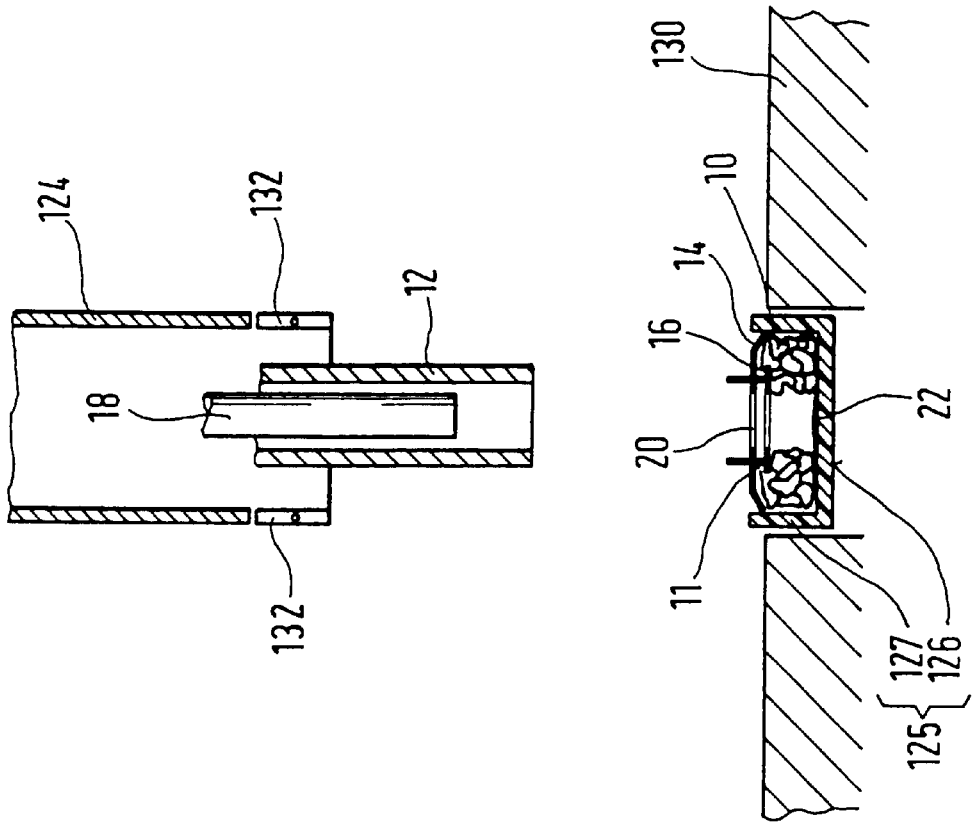
Figure 2C:
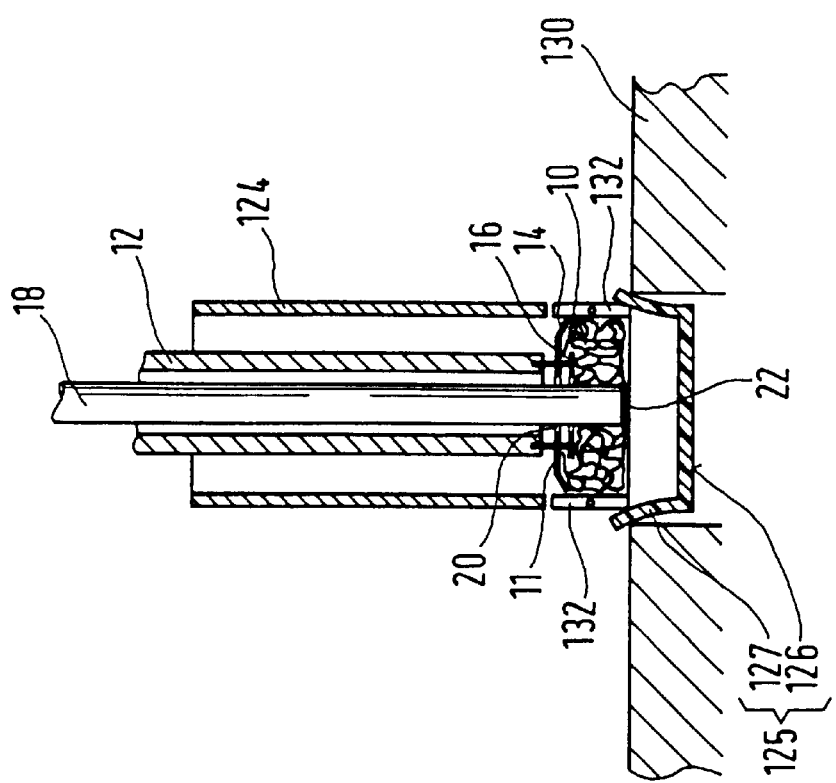

This arrangement is then lowered in the direction of the covering 125, with the bending elements 132, which are in each case brought into their introduction position, bending open the elastically deformable wall section 127 of the covering 125 in accordance with FIG. 2c.

Corresponding to the exemplary embodiment of FIGS. 1a–1f the piston 18 is brought into abutment at the base element 126 of the covering 125, with the closed end 22 of the airbag 10 lying in between, before the carrier element 12 is lowered further in order to press together the airbag 10 inside the ring-shaped folding space to its final packing size. In FIG. 2c the piston 18 is shown in a position which is still at a distance from the base element 126.

After the withdrawing of the sleeve 124, of the carrier element 12 which is released from the base plate 14 or the holder ring 16 respectively and of the piston 18, the airbag 10 is pressed together in the desired manner in the shape of a ring in accordance with FIG. 2d and—substantially with the exception of the installation of a gas generator—is arranged ready for mounting in its covering 25.

In the embodiment illustrated in FIGS. 3a–3d of a folding apparatus in accordance with the invention the airbag 10 is not pressed together to its final packing size in an airbag module covering. Instead, a base element 226 is provided in accordance with FIG. 3a which is a constituent of a working plate 230.

As a continuation of the fastening of the airbag 10 at the base plate 14 or the holder ring 16 respectively and the pushing in of the piston 18 into the airbag 10 in accordance with FIG. 3b, which takes places as previously described, the sleeve 224, which is at first arranged beneath the working plate 230 in accordance with FIG. 3a, is pushed upwards through cutouts 34 which are formed between the base element 226 and the bordering region of the working plate 230, over the base element 226 and about the downwardly hanging airbag 10 until it abuts against the base plate 14, and the state which is illustrated in FIG. 3b is achieved.

Then the entire arrangement is lowered in the direction of the base element 226, with the carrier element 12 pushing the sleeve 224 back again downwardly through the cut-outs 34 by means of the base plate 14.

Figure 3D:
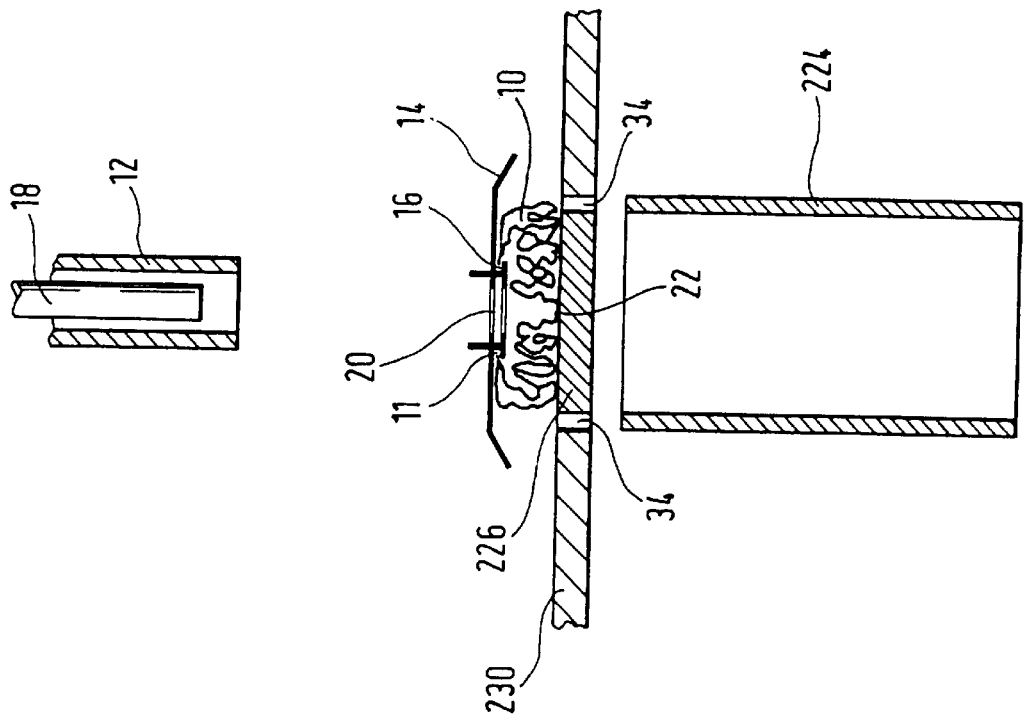
Figure 3C:
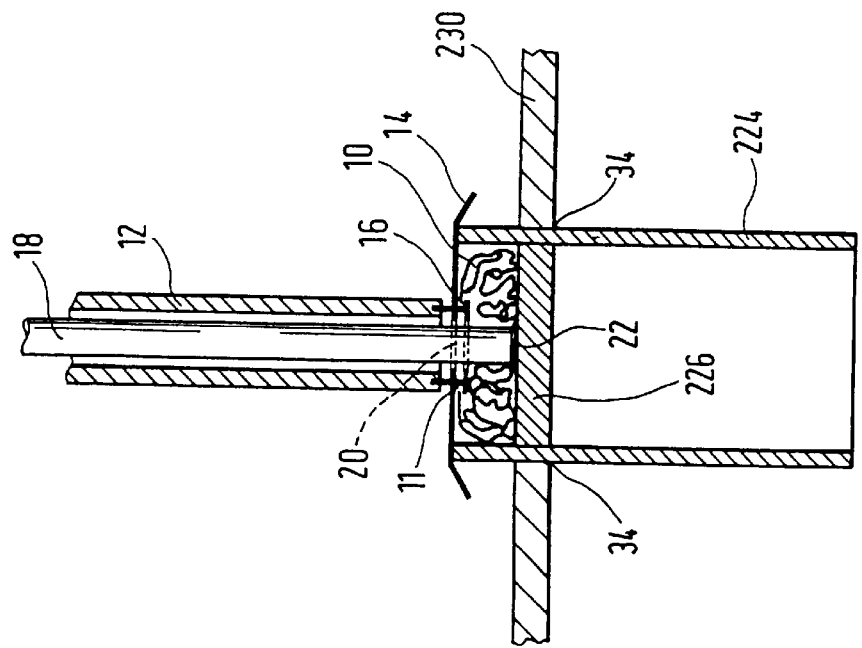

In this the piston 18 first enters into abutment at the base element 226, with the closed end 22 of the airbag 10 lying in between, whereupon in a further lowering of the carrier element 12 the airbag 10 is pressed together to its final packing size within the ring-shaped folding space, as is illustrated in FIG. 3c.

After the releasing of the connection between the carrier element 12 and the base plate 14 or the holder ring 16 respectively and the moving back of the carrier element 12 and the piston 18, the pressed together airbag 10, which in accordance with FIG. 3d lies on the base element 226, can be inserted together with the base plate 14 and the holder ring 16 into an airbag module covering, provided with a gas generator and mounted in a vehicle.

What is claimed is:

1. A method for folding an inflatable airbag having an interior, an open end and a closed end in opposed relation to the open end, the method comprising the steps of:

fastening the open end of the airbag at a carrier;

pushing a piston through an opening in the carrier and against the closed end of the airbag; and introducing the carrier and the piston into a sleeve extending towards a covering of an airbag module comprising a cover base element and a wall section connected to the cover base element such that the airbag is pressed together irregularly into the covering within a region bounded by the wall section.

2. The method in accordance with claim 1, wherein a space which is bounded by the carrier, the piston, the sleeve and the cover base element is made progressively smaller until the airbag is pressed together to a final desired packing size.

3. The method in accordance with claim 1, wherein the airbag includes one or more elongate connection elements extending between the closed end of the airbag and at least one of the open end and the carrier and wherein the elongate connection elements are placed into tension by the piston.

4. The method in accordance with claim 1, wherein the piston is moved into a position adjacent the cover base element such that a region of the closed end of the airbag is pressed against the cover base element.

5. The method in accordance with claim 1, wherein the wall section of the covering is widened by elastic deformation prior to introduction of the carrier into the covering.

6. The method in accordance with claim 1, wherein the open end of the airbag is fastened to a subassembly of an airbag module comprising a base plate and a holder element releasably connected to the carrier such that the carrier may be released from the subassembly after the airbag is pressed together to a desired final packing size.

7. The method in accordance with claim 1, wherein prior to the introduction of the carrier into the sleeve, the airbag is pressed together towards the piston by pusher elements arranged about the piston.

8. The method in accordance with claim 1, wherein prior to introduction of the carrier into the sleeve, the airbag is allowed to fall downwardly into the sleeve.

9. A method for folding an inflatable airbag having an interior, an open end and a closed end in opposed relation to the open end, the method comprising the steps of:

fastening the open end of the airbag at a carrier;

pushing a piston through an opening in the carrier and against the closed end of the airbag;

introducing the carrier and the piston into a sleeve;

moving the airbag, the piston and the sleeve in the direction of a stationarily arranged base element; and subsequently moving the carrier relative to the sleeve in the direction towards the stationarily arranged base element such that the airbag is pressed together irregularly at the stationarily arranged base element.

10. A method for folding an inflatable airbag having an interior, an open end and a closed end in opposed relation to the open end, the method comprising the steps of:

fastening the open end of the airbag at a carrier;

pushing a piston through an opening in the carrier and against the closed end of the airbag;

introducing the carrier and the piston into a sleeve; and moving the airbag, the piston and the sleeve in the direction of a stationarily arranged base element such that the sleeve is pushed over the base element until the distance between the carrier and the base element substantially corresponds to a final desired packing height for the pressed together airbag.

11. An apparatus for the folding of an inflatable airbag, the apparatus comprising, a carrier at which an open end of the airbag can be fastened, a piston for insertion through an opening in the carrier into an interior portion of the airbag to apply pressure against a closed end of the airbag, and a sleeve into which the carrier and the piston can be introduced, the carrier being releasably connected to a subassembly of an airbag module including a base plate and a substantially ring shaped holder element wherein the size and shape, of the base plate substantially corresponds to the size and shape of the free inner cross-sectional surface of the sleeve, the carrier and the piston being moveable relative to a base element to press the airbag together at the base element.

12. An apparatus for the folding of an inflatable airbag, the apparatus comprising, a carrier at which an open end of the airbag can be fastened, a piston for insertion through an opening in the carrier into an interior portion of the airbag to apply pressure against a closed end of the airbag, and a sleeve into which the carrier and the piston can be introduced, the carrier and the piston being moveable relative to an airbag covering arranged beneath the sleeve, wherein the covering comprises a cover base element and a wall section connected to the cover base element, such that upon movement of the carrier towards the cover base element the airbag is folded in a substantially irregular arrangement within a region between the piston and the wall section.

13. The apparatus in accordance with claim 12, wherein the sleeve includes bending elements for spreading the wall section of the cover prior to insertion of the carrier.

14. The apparatus in accordance with claim 12, wherein the cross-section of the carrier substantially corresponds with respect to its shape and size to the perimeter boundaries of the finally pressed together airbag.

15. The apparatus in accordance with claim 12, wherein the sleeve is substantially stationary.

16. The apparatus in accordance with claim 12, wherein the sleeve is moveable in surrounding relation to the covering as the carrier moves towards the cover base element.

* * * * *